United States Patent [19]

Kikuno

[11] 4,408,836

[45] Oct. 11, 1983

[54] WIDE SCREEN LCD PANEL WITH ELECTRICAL TERMINAL CONNECTIONS

[75] Inventor: Masayuki Kikuno, Yamatokoriyama, Japan

[73] Assignee: Sharp Kabushiki Kaisha, Osaka, Japan

[21] Appl. No.: 238,817

[22] Filed: Feb. 27, 1981

[30] Foreign Application Priority Data

Feb. 28, 1980 [JP] Japan ................................ 55-24885

[51] Int. Cl.³ ............................................... G02F 1/133
[52] U.S. Cl. .................................... 350/334; 350/336
[58] Field of Search ................ 350/330, 331 R, 333, 350/334, 336, 356, 357, 392

[56] References Cited

U.S. PATENT DOCUMENTS 3,675,988 7/1972 Soref .................................... 350/336
3,861,783 1/1975 Dill et al. ........................ 350/344 X

FOREIGN PATENT DOCUMENTS 2434422 10/1975 Fed. Rep. of Germany ...... 350/334
55-69186 5/1980 Japan ................................... 350/330

*Primary Examiner*—John K. Corbin
*Assistant Examiner*—David Lewis
*Attorney, Agent, or Firm*—Birch, Stewart, Kolasch & Birch

[57] ABSTRACT

A liquid crystal display device includes a plurality of individual and discrete liquid crystal display cells each having two plates disposed in respective directions normal to each other so as to form extension portions in these directions together with overlap portions for assembly of the respective cells. The cells are assembled into a single wide-screen liquid crystal display panel such that lead terminals are disposed in the extension portions of the plates using electrically conductive members, such as elasmatic rubber connectors, for connecting the lead terminals. The lead terminals are maintained in overlapping and electrically conductive relationship via said conductive members.

5 Claims, 17 Drawing Figures

WIDE SCREEN LCD PANEL WITH ELECTRICAL TERMINAL CONNECTIONS

BACKGROUND OF THE INVENTION

This invention relates to a wide screen liquid crystal display panel.

It is self-evident that the screen size of a single liquid crystal display cell is limited. It is difficult from a technical point of view to build up a wide screen by means of a single cell structure. One approach to overcome this problem is to use a plurality of individual and discrete liquid crystal cells and hold a top plate 1 and a bottom plate 2 in disalignment in a horizontal direction as suggested in FIG. 1. This approach, however, has the disadvantage that a non-display section including connectors 5 disposed between electrode terminals and sealants (not shown) disposed between the plates 1 and 2 a relatively wide area as compared with a display section 4 and a high density display pattern is not possible. Futhermore, electric connections between the electrode terminals are unstable and unreliable.

OBJECTS AND SUMMARY OF THE INVENTION

Accordingly, it is an object of the present invention to provide a liquid crystal display device which sets up a wide screen through a combination of a plurality of individual and discrete liquid crystal cells and provides highly stable and dependable electric connections between the individual cells.

In accordance with a preferred aspect of the present invention, there is provided a liquid crystal display device comprising a plurality of liquid crystal display cells each having two plates disposed in respective directions normal to each other as to form extension portions of these directions together with overlap portions, lead terminals disposed in said extension portions of said plates and electrically conductive members for connecting said lead terminals such that said lead terminals are maintained in overlaping and electrically conductive relationship via said conductive members.

With such an arrangement, the present invention provides a wide screen liquid crystal display panel while allowing great flexibility for selection of the shape and size of a combination of a plurality of liquid crystal display cells. Furthermore, the liquid crystal display panel is very convenient to make on a mass production basis and exchange new cells for damaged ones due to the feasibility of making the top plate and the bottom plate in the same shape and dimension. The mechanical strength of the connection section is insured due to the fact that the bulk of the liquid crystal display cells are stacked and overlapped with each other.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
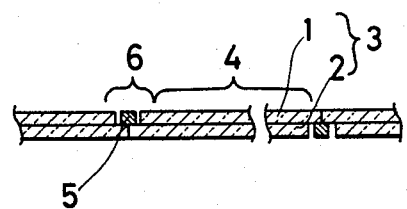
FIG. 1 is a cross-sectional view showing a conventional panel.
Figure 2:
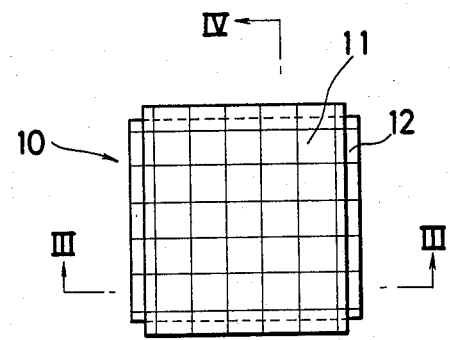
FIG. 2 is a plan view of an embodiment of the present invention.
Figure 3:
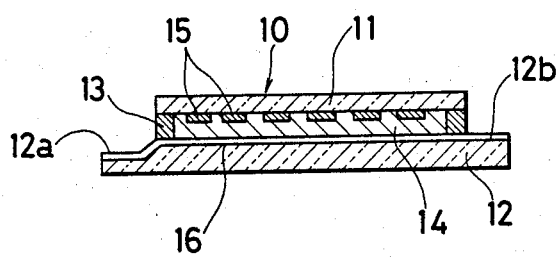
FIG. 3 is a cross-sectional view taken on the line III—III in FIG. 2.
Figure 4:
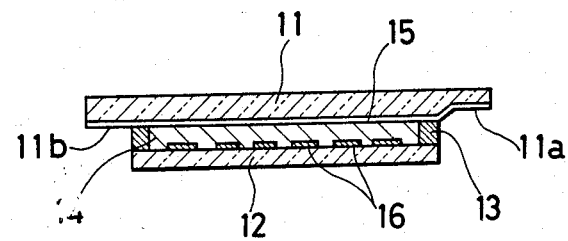
FIG. 4 is a cross-sectional view taken on the line IV—IV in FIG. 2.

In FIGS. 2, 3 and 4, there is shown a liquid crystal display cell in a plan view, a cross-sectional view taken on the line III—III and a cross-sectional view taken on the line IV—IV in FIG. 2. As is well known in the art, the liquid crystal cell 10 comprises a layer of liquid crystal material 14 injected in a cavity defined by a top plate 11 typically of glass and a bottom plate 12 typically of glass facing against the top plate 11. The top plate 11 and the bottom plate 12 carry electrodes 15 and 16 aligned normal to each other, thus forming a lattice-like electrode pattern. As seen from FIG. 4, both ends of the top plate 11 along a vertical direction are provided with electrode pads 11a and 11b which extend beyond the top and bottom edges of the bottom plate 12, whereas the left and right extremes of the bottom plate 12 along a horizontal direction are provided with electrode pads 12a and 12b which extend beyond the left and right edges of the top plate 11. Terminals leading from electrodes 15 are aligned on the pads 11a and 11b of the top plate 11 and the counterpart terminals leading from electrodes 16 are aligned on the pads 12a and 12b of the bottom plate 12.

A plurality of the liquid crystal cells 10 so constructed (e.g., 4 cells in FIG. 5) are closely disposed in such a way as to build up a display screen 17. For the buildup of the screen 17 the pads 11a and 11b of the top plate 11 are stacked on the pads 12a and 12b of the bottom plate 12 with the intervention of a appropriate electrically conductive connector member 18 such as an anisotropic elastomer connector as shown in FIG. 6. This insures that the electrodes 15 and 16 are maintained in conducting relationship. It is preferable that the conductive rubber connector 18 be bonded to the top plate 11 or the bottom plate 12 by an appropriate adhesive to assure ease of assembly of the respective liquid crystal display cells 10.

It is essential that one of the pads 11a or 11b of the top plate 11 and one of the pads 12a or 12b of the bottom plate 12 be thinner than the overlapping portion of the opposite plate and thinner than display section 20(that is, $d_1 < d_2$). This avoids an objectional difference of level between the top and bottom plates 11 and 12 of two adjacent cells 10 when the respective cells are assembled with the intervention of the conductive rubber connector 18. The difference of thickness (i.e., $d_2 - d_1$) is selected based on the thickness $d_3$ and modulus of elasticity of the conductive rubber connector 18, the product of stress applied per terminal and the number of terminals in connection with the electrodes 15 and 16, the degree of deflection of the top and bottom plates 11 and 12, etc.

Figure 5:
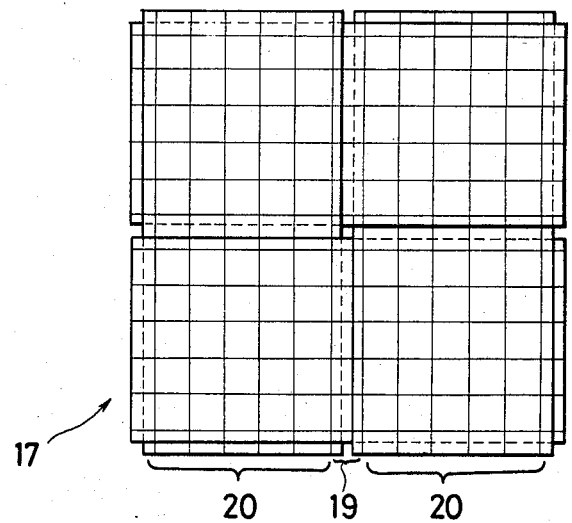
FIG. 5 is a plan view of a combination of four discrete liquid crystal cells.
Figure 6:
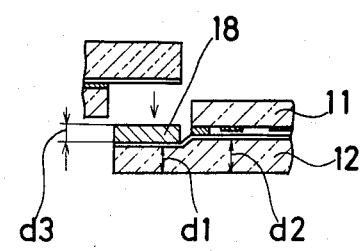
FIG. 6 is an enlarged cross-sectional view of a connection section of the liquid crystal cells.

However, provided that the plurality of the liquid crystal cells 10 are combined merely as shown in FIG. 5, the color of a non-display section 19 including the above-mentioned pads and seals is different from that of a display section 20, thus giving the viewers the impression of difference and imparing economical value of the panel. It is therefore necessary to bring the color tone of the non-display section 19 into agreement with that of the display section 20. A positive type liquid crystal display panel constructed with the foregoing in mind is illustrated in a cross sectional view of FIG. 7. The respective liquid crystal cells 10 are disposed on a polarizer 22 backed with a refective plate 21. The pads of the top plate 11 are provided with a thin film 23 extending over the non-display section 19 and having the same color as the color of the non-display section 19 in the non-operative state or the color of the reflective plate 21. A polarizer 24 which extends over the top plate 11 is disposed on the thin film 23. If the case permits, a reinforcing plate 25 typically of acrylic resin is installed on the polarizer 24.

The reflective plate 21 is usually made of aluminum and the film 23 is also preferably made of an aluminum foil. In this case the color tone of the aluminum foil is not same as that of the reflective plate 21 per se but the color tone of the display section 20, in other words, the color tone of the reflective plate 21 as viewed through the top plate 11, the liquid crystal layer and the bottom plate 12.

Figure 8:
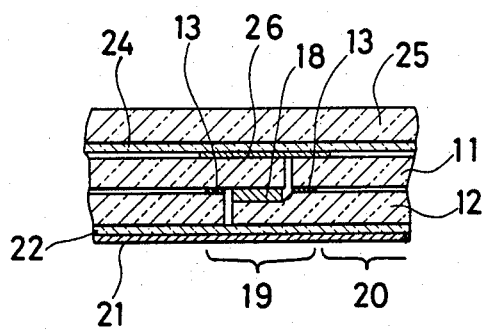

FIG. 8 is a cross sectional view of a negative type liquid crystal display panel in accordance with another preferred embodiment of the present invention, wherein a black coating at the back of the polarizer 24 takes the place of the thin film 23, the black coating extending over the display section 19 in a like manner as the thin film 23. This arrangement also alleviates the impressions of difference between the display and non-display sections 20 and 19. It is also obvious that a thin film of black material may be disposed on the polarizer 24 instead of the black coating.

Figure 9:
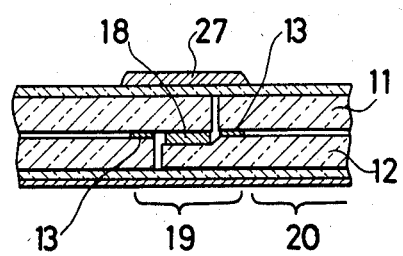
FIGS. 8, 9 and 10 are cross-sectional views of a negative type liquid crystal display panel.

FIG. 9 illustrates a negative type liquid crystal display panel in accordance with yet another embodiment of the present invention, wherein the reinforcing plate 25 as in FIG. 8 is eliminated and a metallic sheet 27 of a high bending resistance overlaid with a black coating is provided to screen the non-display section 19 from view. The metallic sheet 27 eliminates the need for the reinforcing plate 25 and offsets the impressions of difference between the non-display and display sections 19 and 20.

Figure 10:
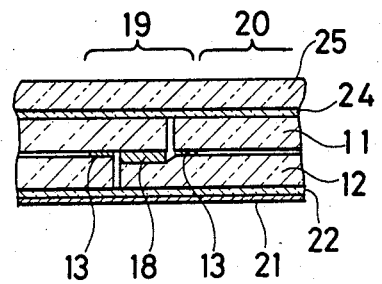

FIG. 10 illustrates a negative type liquid crystal display panel in accordance with still another embodiment of the present invention, wherein a black coating overlies the conductive rubber connector 18 and the sealant 13 and avoids the impressions of difference between the non-display and display sections 19 and 20 as in the previously discussed embodiments.

Figure 7:
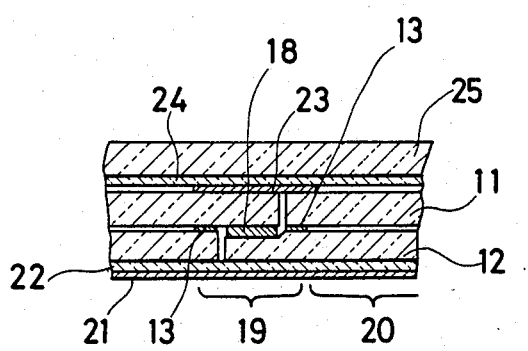
FIG. 7 is a cross-sectional view of a positive type liquid crystal display panel.
Figure 11:
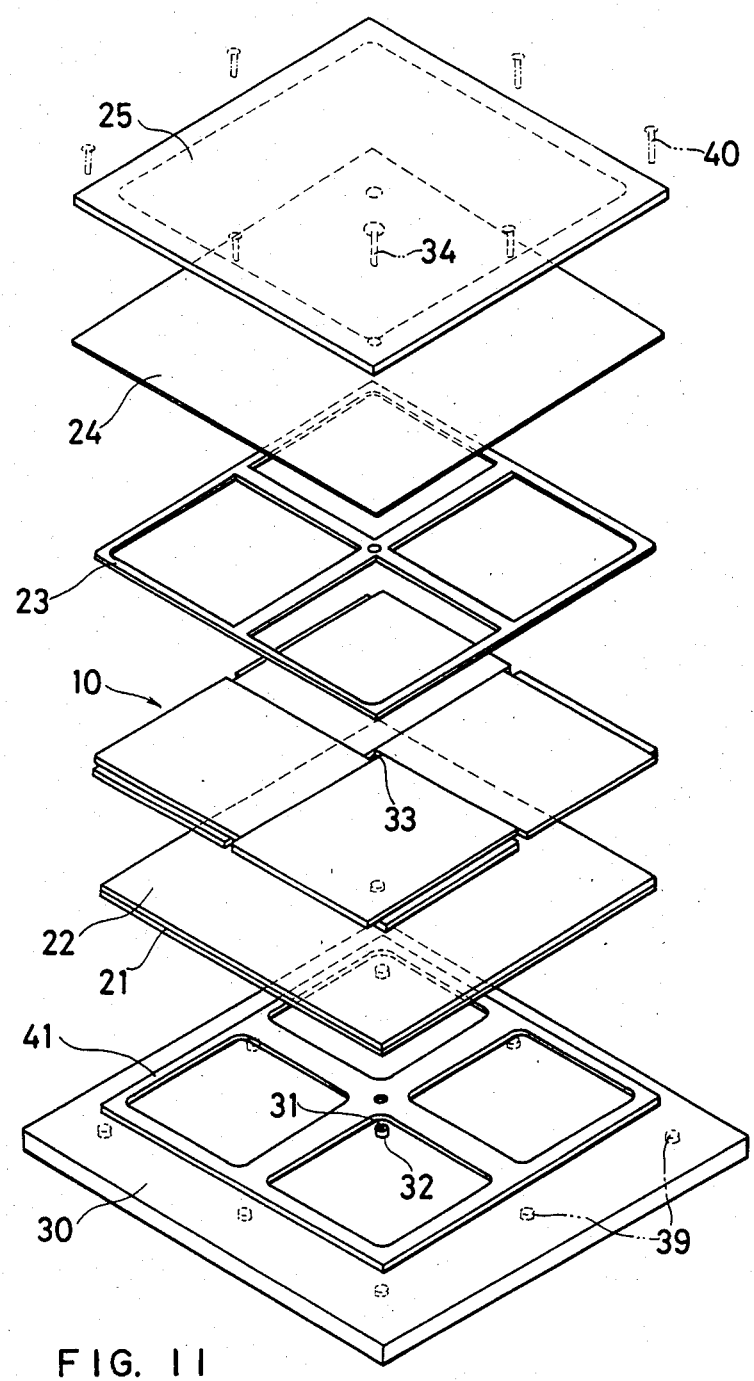
FIG. 11 is an exploded perspective view of the positive type liquid crystal display panel.
Figure 12:
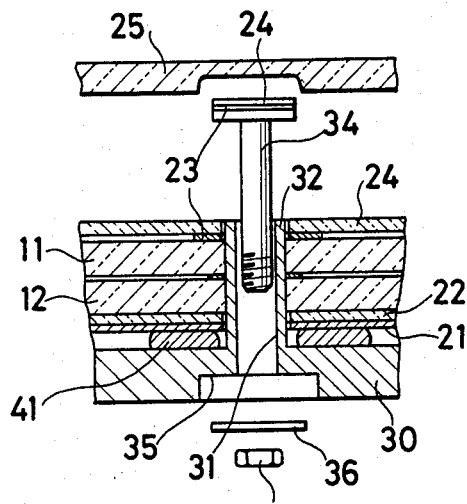
FIG. 12 is a cross sectional view of the connection section in the positive type panel during assembly.

FIG. 11 is an exploded view of the negative type liquid crystal display panel as shown in FIG. 7 and FIG. 12 is a cross sectional view of the same panel during assembly. A bottom support 30 for this positive type liquid crystal display panel is provided at its central portion with a projection 32 having a through-hole 31. For assembly the projection 32 is inserted into a central aperture 33 of the four liquid crystal units 10 combined as shown in FIG. 5 with its top end flush with the top surface of the polarizer 24. A threaded stud 34 is then inserted from above into the through-hole 31 and tightly fixed in a recess 35 in the bottom support 30 by a washer 36 and a nut 37. The thin film 23 and the polarizer 24 are provided at the head of the threaded stud 34. After the completion of fastening the respective cells 10 by means of the threaded stud 34 the resultant panel is overcovered with the reinforcing plate 25.

Figure 13:
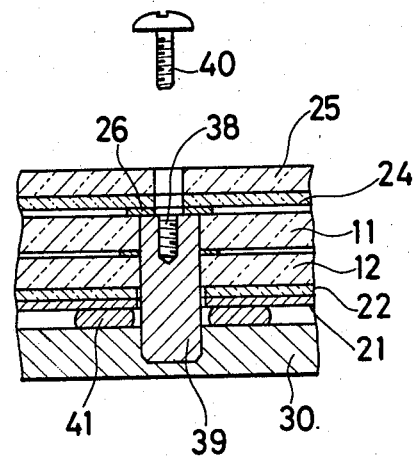
FIG. 13 is a cross sectional view of the negative type liquid crystal display panel during assembly.

FIG. 13 is a cross sectional view of the negative liquid crystal display panel during assembly. In the case of the negative type liquid crystal display panel, the bottom plate 30 is provided with projections 39 having inner threaded grooves 38 as depicted in the phantom line. A bolt 40 with a black coating is screwed into the threaded grooves 38 from above the reinforcing plate 25 to complete assembly.

Whether the liquid crystal display panel is positive or negative, it is preferable that a buffer plate 41 be installed between the bottom support 30 and the reflective plate 21 to curb fastening force by the bolt 34 or 40.

Figure 14:
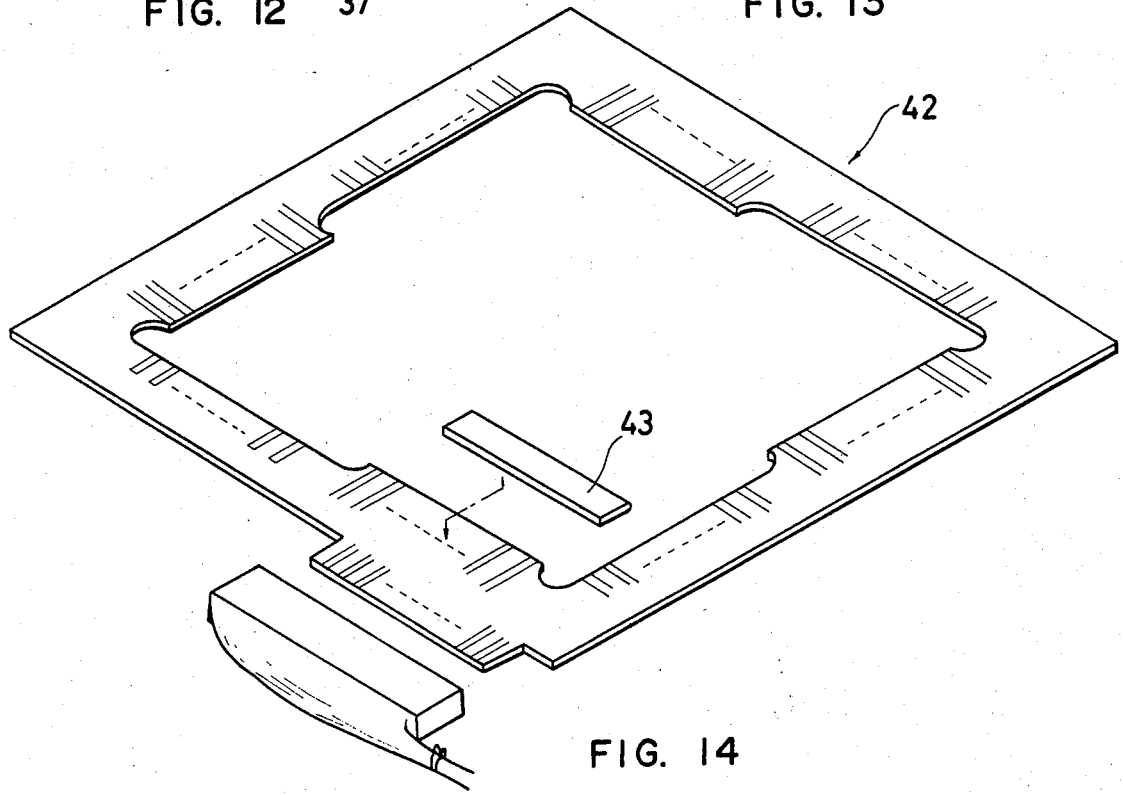
FIG. 14 is a perspective view of a printed circuit board to which the connection section of the liquid crystal display panel is connected.
Figure 15:
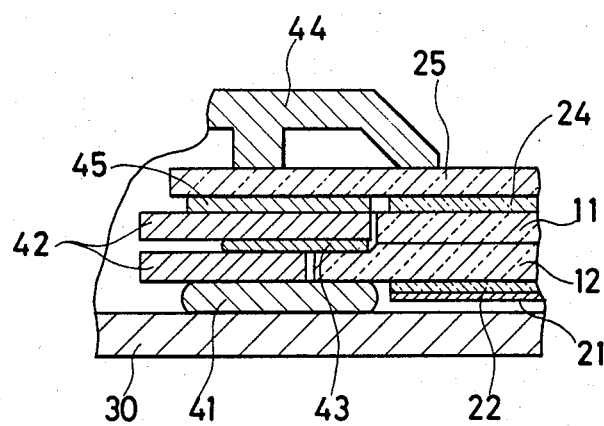
FIG. 15 is an enlarged cross sectional view of the connection section.

The following will set forth one way by which to connect the resultant wide screen liquid crystal display panel to an external circuit. FIG. 14 shows a printed circuit board 42 to which the panel is to be connected and FIG. 15 shows a connection section on an enlarged scale. In this case two printed circuit boards 42 are employed and the electrode terminals on the top plate 11 are connected to the equivalent of the bottom plate 12 via a connector 43 and between the bottom support 30 and a top support 44. A buffer plate 45 is interposed between the reinforcing plate 25 and the printed circuit board 42. With such an arrangement only the single connector 43 is necessary.

Figure 16:
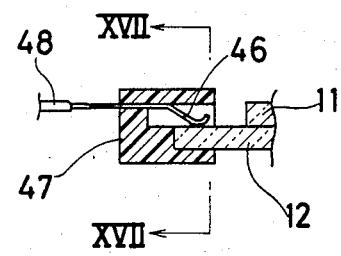
FIG. 16 is a cross sectional view of a connection section for connection to an external circuit in accordance with another embodiment of the present invention.
Figure 17:
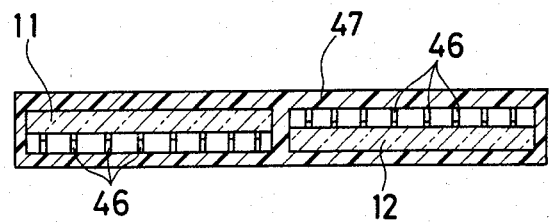
FIG. 17 is a cross sectional view taken on the line XVII—XVII.

FIG. 16 shows another connection structure in a cross sectional view and FIG. 17 is a cross sectional view the line XVII—XVII in FIG. 16. The top plate 11 and the bottom plate 12 of the liquid crystal display cells 10 are held in a grip 47 by means of a contact 46 to which a lead wire 48 is connected.

The invention being thus described, it will be obvious that the same may be varied in many ways. Such variations are not to be regarded as a departure from the spirit and scope of the invention, and all such modifications are intended to be included within the scope of the following claims.

What is claimed is:
1. A liquid crystal display device comprising:
a plurality of liquid crystal display cells in a substantially coplanar arrangement;
each cell comprising two plates disposed in parallel planes;
each of said plates having a length which exceeds the width of the other of said plates, the lengths of the respective plates extending in respective directions which are normal to each other, thereby forming extension portions for overlapping similar extension portions of adjacent cells;

lead terminals disposed on said extension portions of said plates; and electrically conductive members for connecting said lead terminals of respective ones of said cells to said lead terminals of adjacent coplanar cells in overlapping and electrically conductive relationship.

2. A liquid crystal display device as set forth in claim 1 further comprising means for screening said lead terminals from view.

3. A display device as set forth in claim 1, wherein said electrically conductive members comprise conductive elastomer connectors.

4. A display device as set forth in claim 1, wherein at least some of said extension portions of said plates comprise reduced thickness portions of said plates for receiving said electrically conductive members between overlapped extension portions.

5. A display device as set forth in claim 3, wherein at least some of said extension portions of said plates comprise reduced thickness portions of said plates for receiving said elastomer connectors between overlapped extension portions.

* * * * *